(12) United States Patent
Suhara (10) Patent No.: US 7,130,130 B2
(45) Date of Patent: Oct. 31, 2006

(54) OPTICAL SCANNING LENS, OPTICAL SCANNING DEVICE AND IMAGE FORMING APPARATUS

(75) Inventor: Hiroyuki Suhara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/315,183

(22) Filed: Dec. 10, 2002

(65) Prior Publication Data

US 2003/0063358 A1 Apr. 3, 2003

Related U.S. Application Data

(63) Continuation of application No. 09/865,523, filed on May 29, 2001, now Pat. No. 6,532,094.

(30) Foreign Application Priority Data

May 31, 2000 (JP) ............................. 2000-161586

(51) Int. Cl.
*G02B 9/00* (2006.01)
*G02B 26/08* (2006.01)

(52) U.S. Cl. ...................... 359/654; 359/652; 359/205

(58) Field of Classification Search ................ 359/652, 359/654, 205–207, 662
See application file for complete search history.

(56) References Cited

U.S. PATENT DOCUMENTS 5,818,621 A * 10/1998 Iizuka ........................ 359/206
6,400,391 B1 6/2002 Suhara et al.

FOREIGN PATENT DOCUMENTS

| JP | 8-136848 | 5/1996 |
| JP | 9-49976 | 2/1997 |
| JP | 11-44641 | 2/1999 |

* cited by examiner

*Primary Examiner*—James Phan
(74) *Attorney, Agent, or Firm*—Oblon, Spivak, McClelland, Maier & Neustadt, P.C.

(57) ABSTRACT

An optical scanning lens used in a scanning and imaging optical system in which a beam deflected by a light deflector is condensed on or in the vicinity of a surface to be scanned. The optical scanning lens is formed through plastic mold, and a distribution of the refractive indexes $\Delta n(x)$ inside of the optical scanning lens has a local maximum within a range through which the beam passes through the lens.

5 Claims, 6 Drawing Sheets

OPTICAL SCANNING LENS, OPTICAL SCANNING DEVICE AND IMAGE FORMING APPARATUS

This application is a continuation of application Ser. No. 09/865,523, filed May 29, 2001, U.S. Pat. No. 6,532,094.

BACKGROUND OF THE INVENTION

1. Field of the Invention

The present invention relates to an optical scanning lens, an optical scanning device and an image forming apparatus.

2. Description of the Related Art

In an optical scanning device widely known with reference to a laser printer, a digital copier, and so forth, a beam emitted from a light source is deflected by a light deflector, the deflected beam is condensed toward a surface to be scanned by a scanning and imaging optical system, a beam spot is formed thereby on the surface to be scanned, and thus, optical scanning of the surface to be scanned is performed.

Recently, a plastic-made (made of plastic) optical scanning lens is employed as the scanning and imaging optical system or as a part thereof.

The plastic-made optical scanning lens is formed through plastic mold. As this type of lens can be easily mass-produced, it can be manufactured at low costs. Accordingly, by employing the plastic-made optical scanning lens, it is possible to effectively reduce the costs of the scanning and imaging optical system, and, thereby, the costs of the optical scanning device. Further, with regard to the plastic-made optical scanning lens, it is possible to easily form a special lens surface shape such as an aspherical surface through plastic mold. Accordingly, it is possible to simplify the scanning and imaging optical system (reducing the number of lenses required) and/or to improve optical performance thereof.

However, this type of plastic-made optical scanning lens has a problem in that a non-uniform distribution of the refractive indexes occurs inside of the plastic-made optical scanning lens.

Through plastic mold, molding is performed in which thermally molten plastic material is injected into a die, and is cooled in the die. At this time, cooling begins from a part of the material in contact with the die. Accordingly, the center of the plastic material is cooled slowly relative to the periphery thereof. Thereby, a non-uniform distribution of density (the density at a part cooled rapidly becomes higher than that at a part cooled slowly) inside of the plastic. As a result, the distribution of the refractive indexes of the thus-formed lens is not uniform inside thereof. As the density of the periphery of the formed lens is higher than that of the center thereof, the refractive index is lower at the lens center while, the nearer to the surface the position thereof becomes, the higher the refractive index of the formed lens becomes, in general.

When the distribution of the refractive indexes of the plastic lens is measured by a method described later, the variation in refractive index is like an approximately quadratic curve along each of a lens optical axis direction, a main scanning direction and a sub-scanning direction.

The plastic-made optical scanning lens is designed assuming that the distribution of refractive indexes inside thereof is uniform. Accordingly, when the plastic lens has a non-uniform distribution of refractive indexes inside thereof, it cannot exhibit the performance according to the design. Specifically, defocus occurs such that a position of imaging of the deflected beam differs from the surface to be scanned, thereby, a position of beam waist of the deflected beam is changed from the surface to be scanned, and, as a result, the diameter of the beam spot increases.

In order to reduce such a non-uniform distribution of refractive indexes inside of the lens, it can be considered to cool the molten plastic material in the die, very slowly for a long time (for example, for ten and some hours) in a thermostatic chamber. However, by such a method, the productivity of the optical scanning lens becomes worse, and the manufacturing costs thereof increase. Accordingly, the advantage of the plastic-made lens such as requiring low costs may be cancelled.

SUMMARY OF THE INVENTION

An object of the present invention is to provide an optical scanning lens which has a no problem in optical performance/characteristics thereof, even having relatively a large distribution of refractive indexes inside thereof.

An optical scanning lens according to the present invention is an optical scanning lens used in a scanning and imaging optical system for converging a beam deflected by a light deflector onto or in the vicinity of a surface to be scanned, and is formed through plastic mold, and, a distribution of refractive indexes $\Delta n(x)$ inside of the lens has a local maximum, within a range through which the beam passes through the lens.

The above-mentioned scanning and imaging optical system may include only a single lens, or a plurality of lenses, or at least one lens and a mirror surface (concave surface/convex surface) having an imaging function.

The optical scanning lens according to the present invention is used as at least a component of the scanning and imaging optical system, and, one or a plurality thereof is/are disposed in the scanning and imaging optical system. It is also possible that the scanning and imaging optical system is formed by the optical scanning lens itself.

As a plastic material of the optical scanning lens, any one of acrylic resin (PMMA/alicyclic acrylic resin), PC (polycarbonate), polyolefin resin (ordinary polyolefin/alicyclic polyolefin), and so forth can be used.

When a lens is formed through plastic mold by using such resin material, acrylic resin has an advantage such that the optical elastic constant thereof is small and double refraction is not likely to occur therein. PC has an advantage such that the refractive index thereof is high, also, the moisture absorbing rate thereof is small, and, the optical characteristics of the lens is not likely to be affected by the environment. Polyolefin resin has an advantage such that the moisture absorbing rate thereof is small, and double refraction is not likely to occur therein.

Any of the above-mentioned materials causes a non-uniform distribution of refractive indexes inside the lens during a process of the plastic mold therefor. Thereamong, polyolefin resin is one which causes a non-uniform distribution of refractive indexes during the process of the plastic mold, most remarkably. Therefore, the present invention is effective in a case where the polyolefin resin is used as a material of the optical scanning lens.

The above-mentioned range through which the beam passes through the lens is a range for which the beam deflected by the light deflector passes through the lens during the deflection thereof. Specifically, with respect to the main scanning direction, this range is a range through which the deflected beam passes through the lens so that the beam thus having passed through the lens scans an effective writing range on the surface to be scanned. With respect to the sub-scanning direction, the range through which the beam passes through the lens is a range determined in consideration of a possible variation in angle of emission of light from the light source, a possible inclination of the deflection reflective surface of the light deflector, and so forth. The range through which the beam passes through the lens with respect to the sub-scanning direction may be preferably ±2 mm from a plane parallel to the main scanning direction and including the optical axis, normally, in the scanning and imaging optical system of a laser printer or the like. The size of the range through which the beam passes through the lens may vary according to optical requirements such as the effective writing range, diameter of beam spot, and so forth.

The definition of the above-mentioned distribution of the refractive indexes Δn(x) inside of the lens will be described later.

The above-mentioned feature of the present invention in that the distribution of the refractive indexes Δn(x) has a local maximum means that, when this distribution is approximated by using a polynominal, of an order equal to or more than third order (practically, even order, not less than fourth order and not more than tenth order), of a variable x, within the range through which the beam passes through the lens, the thus-approximated distribution has a range in which $dn/dx=0$ and also $d^2n/dx^2<0$, hereinafter.

It is preferable that the above-mentioned distribution of the refractive indexes Δn(x) also has a local minimum. This means that the above-mentioned approximated distribution also has a range in which $dn/dx=0$ and also $d^2n/dx^2>0$, hereinafter.

Further, it is preferable that the above-mentioned distribution of the refractive indexes Δn(x) satisfies the following requirement:

$$0.1\times10^{-5}<LMAX[\Delta n(x)]-\min[\Delta n(x)]<4\times10^{-5} \quad (1)$$

where LMAX[Δn(x)] denotes the above-mentioned local maximum, and min[Δn(x)] denotes the minimum value of the above-mentioned distribution of the refractive indexes Δn(x).

Further, it is preferable that the above-mentioned distribution of the refractive indexes Δn(x) satisfies the following requirement:

$$1\leq\{\max[\Delta n(x)]-\min[\Delta n(x)]\}/\{LMAX[\Delta n(x)]-\min[\Delta n(x)]\}<15 \quad (2)$$

where max[Δn(x)] denotes the maximum value of the above-mentioned distribution of the refractive indexes Δn(x).

Furthermore, it is preferable that the above-mentioned distribution of the refractive indexes Δn(x) is a distribution in a sub-scanning section on or in the vicinity of the center of the lens in the main scanning direction.

The above-mentioned sub-scanning section means an imaginary planar section of the optical scanning lens perpendicular to the main scanning direction. Similarly, a planar section parallel to the main scanning direction and including the optical axis is called a 'main scanning section'.

It is also preferable that the above-mentioned distribution of the refractive indexes Δn(x) satisfies the following requirements same as the above-mentioned requirements (1) and (2):

$$0.1\times10^{-5}<LMAX[\Delta n(x)]-\min[\Delta n(x)]<4\times10^{-5} \quad (1)$$

$$1\leq\{\max[\Delta n(x)]-\min[\Delta n(x)]\}/\{LMAX[\Delta n(x)]-\min[\Delta n(x)]\}<15 \quad (2)$$

The optical scanning device according to the present invention deflects the beam coming from the light source at a uniform angular velocity by the light deflector having the deflection reflective surface, condenses the deflected beam on the surface to be scanned as a beam spot by the scanning and imaging optical system, and, thus, performs optical scanning of the surface to be scanned at a uniform velocity.

As the light source, any one of various types of solid lasers, gas lasers, LEDs, and so forth may be used. However, a semiconductor laser is most preferable. The above-mentioned surface to be scanned is substantially, a photosensitive surface of a photosensitive medium (for example, a photoconductive photosensitive body).

In the above-mentioned optical scanning device, the above-mentioned optical scanning lens according to the present invention is used at least as a part of the scanning and imaging optical system.

An image forming apparatus according to the present invention performs optical scanning of the surface to be scanned so as to form a latent image thereon, and visualizes the latent image so as to obtain a printed image. In the image forming apparatus, as the optical scanning device for performing the optical scanning of the photosensitive surface of the photosensitive medium, the above-mentioned optical scanning device according to the present invention is used.

The photosensitive medium may comprise a photoconductive photosensitive body, and the electrostatic latent image formed on the photosensitive surface through uniform changing and optical scanning of the photosensitive surface may be visualized into a toner image. The toner image is fixed onto a sheet-like recording medium (such as a transfer paper sheet, an OHP sheet (plastic sheet used for an overhead projector), or the like). In such a case, the image forming apparatus is embodied as a laser printer, a laser plotter, a digital copier, a facsimile machine, or the like However, as the above-mentioned photosensitive medium, for example, a sliver bromide photographic film may be used. In this case, the latent image formed through optical scanning by the optical scanning device can be visualized through an ordinary silver bromide photographic process. In such a case, the image forming apparatus is embodied as an optical plate making apparatus, an optical drawing apparatus or the like.

Thus, according to the present invention, the optical scanning lens can have optical characteristics, occurs practically no problems even having a remarkably non-uniform distribution of refractive indexes inside thereof. Accordingly, by using the image forming apparatus including the optical scanning device employing this optical scanning lens, it is possible to render a satisfactory image formation.

Other objects and further features of the present invention will become more apparent from the following detailed description when read in conjunction with the accompanying drawings.

DETAILED DESCRIPTION OF THE PREFERRED EMBODIMENTS

Figure 1:
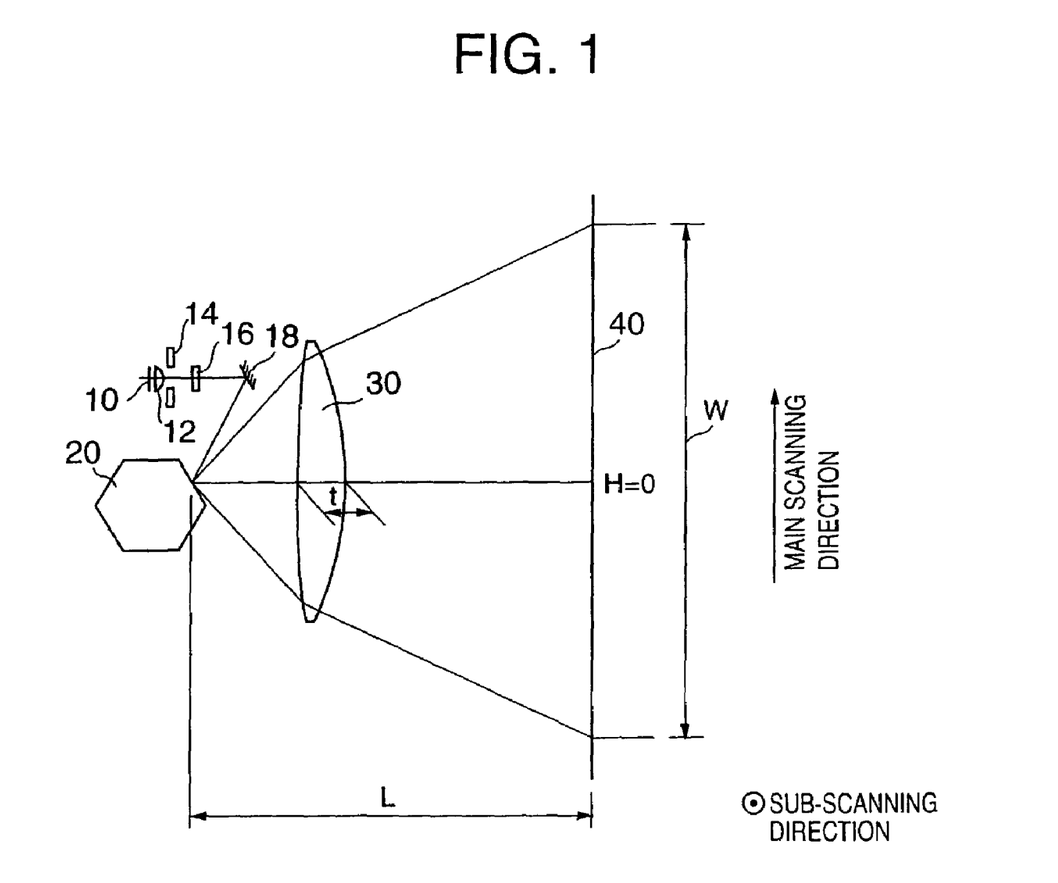
FIG. 1 illustrates an optical scanning device in one embodiment of the present invention.

FIG. 1 illustrates an optical scanning device in one embodiment of the present invention.

A divergent beam emitted from a semiconductor laser 10 (light source) is transformed into a form, such as a parallel beam, suitable for a subsequent optical system by a coupling lens 12, passes through an opening of an aperture 14 so as to undergo beam shaping thereby, is condensed by a cylindrical lens 16 along sub-scanning directions while being reflected by a mirror 18, and thus is imaged to be a line image long along main scanning directions on or in the vicinity of a deflection reflective surface of a polygon mirror 20 (light deflector).

The beam reflected by the deflection reflective surface of the polygon mirror 20 is deflected thereby at a uniform angular velocity with uniform-velocity rotation of the polygon mirror 20, while being incident on an optical scanning lens 30 (forming a scanning and imaging optical system), is condensed onto or to the vicinity of a surface to be scanned 40 (substantially, a photosensitive surface of a photoconductive photosensitive body) by a function of the lens 30, and, thus, the beam forms a beam spot on the surface to be scanned 40. By this beam spot, the surface to be scanned 40 is scanned in the main scanning direction. The photosensitive surface of the surface to be scanned 40 is moved in the sub-scanning direction (perpendicular to FIG. 1) and, simultaneously, the above-mentioned optical scanning along the main scanning direction is repeated. Thereby, writing of a latent image is performed onto the surface to be scanned 40. The above-mentioned optical scanning by the beam spot is made to be at a uniform velocity due to the characteristics/performance of rendering the uniform velocity of the scanning and imaging optical system 30.

In this configuration, the optical scanning lens 30 itself forms the scanning and imaging optical system. When the scanning and imaging optical system includes a plurality of optical components (a plurality of lenses, a combination of a lens and a concave mirror, or the like), it is possible that the scanning and imaging optical system includes one or a plurality of the optical scanning lens(es) according to the present invention described below.

The optical scanning lens 30 is formed through plastic mold (molding by using a plastic material).

The optical scanning lens 30 has a distribution of refractive indexes in a region thereof through which the beam passes (with regard to the main scanning direction, a region corresponding to an effective writing range W on the surface to be scanned 40, shown in FIG. 1).

The distribution of refractive indexes will now be described with reference FIGS. 2A, 2B, 2C, 2D and 2E.

In FIGS. 2A through 2E, a lens 1 corresponding to the above-mentioned optical scanning lens 30 formed through plastic mold is shown. However, as FIGS. 2A through 2E are drawings merely for illustrating a concept of the distribution of refractive indexes, and the distribution of refractive indexes shown in FIGS. 2A through 2E is different from that of the optical scanning lens 30 according to the present invention.

Figures 2A, 2B, 2C, 2D, 2E:
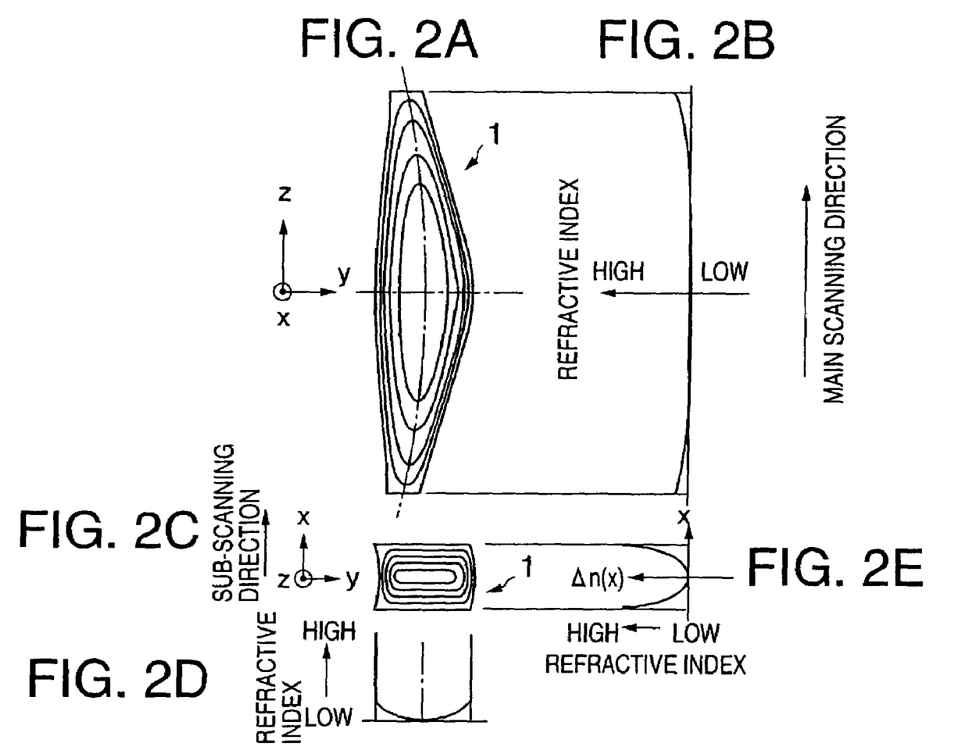
FIGS. 2A through 2E illustrate a distribution of refractive indexes inside of an optical scanning lens.

FIG. 2A illustrates the distribution of refractive indexes along an imaginary section of the lens 1 taken along the above-described main scanning section, by contour lines. In this figure, the nearer to the center the position inside of the lens becomes, the lower the refractive index at the position becomes.

FIG. 2C illustrates the distribution of refractive indexes along an imaginary section of the lens 1 taken along the sub-scanning section including the optical axis, by contour lines. Also in this figure, the nearer to the center the position inside of the lens becomes, the lower the refractive index at the position becomes.

As shown in FIG. 2C, an x-direction and a y-direction are set, and, also, a z-direction is set as a direction perpendicular to FIG. 2C. The y-direction corresponds to the optical-axis direction, x-direction corresponds to the sub-scanning direction. Accordingly, the z-direction corresponds to the main scanning direction.

An absolute refractive index at each position (x, y) in the sub-scanning section at an arbitrary position z along the main scanning direction is represented by n(x, y).

An average of the absolute refractive indexes n(x, y) along the y-axis direction for each x coordinate position is defined by the following operation:

$$[\int n(x, y)dy]/d(x)$$

where d(x) denotes a lens thickness at each x coordinate. The above integration is performed throughout the thickness d(x).

An appropriate reference value is set for the result of the above-mentioned operation. Then, a difference between the thus-set reference value and the above-mentioned operation result is obtained. Thereby, a one-dimensional relative y-axis-averaged refractive indexes Δn(x) along the x-axis direction is obtained from averaging, along the y-axis direction, two-dimensional absolute refractive indexes in an x-y section parallel to the optical axis and sub-scanning direction.

FIG. 2E illustrates these relative refractive indexes Δn(x) with respect to the x coordinate position.

FIG. 2B illustrates relative y-axis-averaged refractive indexes along the z-axis direction similar to the above-mentioned relative y-axis-averaged refractive indexes along the x-axis direction, but obtained from an operation $[\int n(y, z)dy]/d(z)$ where d(z) denotes the lens thickness at each z coordinate.

FIG. 2D illustrates relative x-axis-averaged refractive indexes along the y-axis direction similar to the above-mentioned relative y-axis-averaged refractive indexes along the x-axis direction, but obtained from an operation $[\int n(x, y)dx]/d(y)$, where d(y) denotes the lens thickness at each y coordinate.

As shown in FIG. 2E, the distribution of the refractive indexes Δn(x) of the lens 1 shown in FIG. 2A through 2E has no located local maximum. In this point, this lens 1 is different from the optical scanning lens according to the present invention.

As described above, the relative y-axis-averaged refractive indexes are expressed by a function with respect to the coordinate variable x along the sub-scanning direction, and, in general, can be expressed by a polynominal of x, below:

$$A+Bx+Cx^2+Dx^3+Ex^4+\ldots$$

In general, in many cases, the optical scanning lens has a shape symmetrical with respect to the optical axis along the sub-scanning directions, and, thus, the distribution of the refractive indexes is symmetrical with respect to the optical axis along the sub-scanning directions. Accordingly, the distribution of the refractive indexes can be practically expressed by the following polynominal of even order from among 4-th order through 10-th order:

$$a+bx^2+cx^4+dx^6+ex^8+fx^{10}$$

Then, influence of the above-mentioned distribution of the relative y-axis-averaged refractive indexes $\Delta n(x)$ to optical performance/characteristics of the optical scanning lens will now be described.

For this purpose, the distribution of the relative y-axis-averaged refractive indexes $\Delta n(x)$ is expressed by the following quadratic approximation:

$$\Delta n(x)=n_0+n_1 \cdot x+\Delta n \cdot x^2+\delta(x)$$

In this equation, $\delta(x)$ denotes a residual of the above-mentioned approximation. In each term of the right side of the equation, a secondary coefficient $\Delta n$ gives a large influence to the optical performance. It is possible to omit the primary coefficient $n_1$ according to the above-mentioned standpoint of symmetry. As a result, the above-mentioned equation can be expressed as follows:

$$\Delta n(x) \approx n_0+\Delta n \cdot x^2$$

Thereby, it is possible to calculate the secondary coefficient $\Delta n$.

In the above-mentioned equation, the secondary coefficient $\Delta n$ functions as a lens power.

The influence of the secondary coefficient $\Delta n$ to the lens function will now be described with reference FIG. 3.

Figure 3:
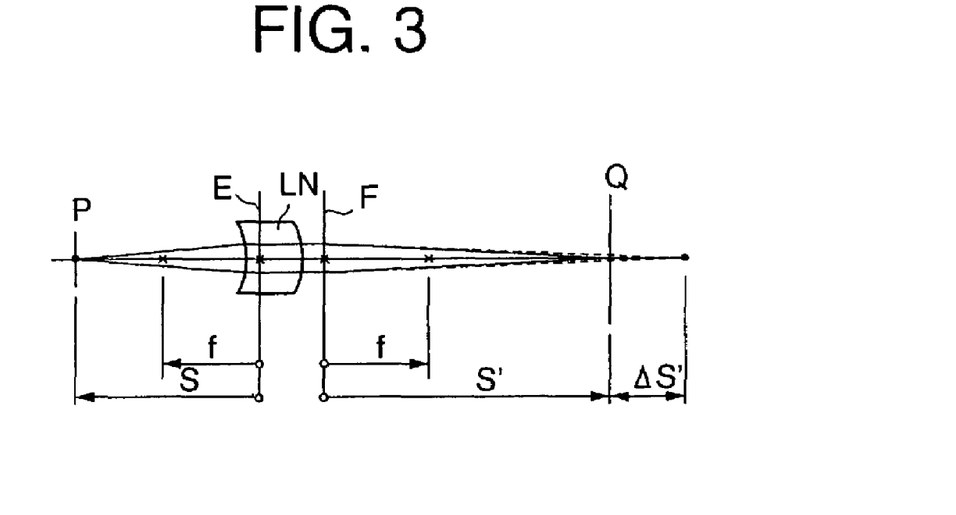
FIG. 3 illustrates an influence of a non-uniform distribution of refractive indexes inside of a lens to optical characteristics of the lens.

In FIG. 3, LN denotes a lens, E, F denote front and rear principal points thereof, respectively, P denotes an object point, and Q denote an image point. 'f' denotes a focal length according to design of the lens LN (that is, the focal length assuming that the distribution of refractive indexes inside of the lens LN is uniform), S, S' denote an object length and an image length according to the design.

As mentioned above, it can be assumed that the distribution of refractive indexes has a function of a lens. Accordingly, it is possible to assume a lens equivalent to the distribution of refractive indexes.

As shown in FIG. 1, L denotes a distance (conjugate length) between the deflection reflective surface of the light deflector 20 and the surface to be scanned 40. Further, a lateral magnification of the scanning lens 30 is represented by β, $\Delta n$ denotes the secondary coefficient of the above-mentioned $\Delta n(x)$, and the thickness of the lens is represented by t, and, then, a defocus amount $\Delta S'$ (see FIG. 3) can be expressed by the following expression through approximation:

$$\Delta S' \approx \{\beta/(\beta-1) \cdot L\}^2 \cdot (2\Delta n \cdot t)$$

Thus, the defocus amount $\Delta S'$ is approximately in proportion to $\Delta n$.

When the optical scanning lens 30 has a positive power, in a case where the refractive index at the lens periphery is higher than that of the lens center as mentioned above, the distribution of refractive indexes functions equivalently as a concave lens, and, thereby, functions to shift a position, at which the beam spot to be condensed onto the surface to be scanned is actually condensed, in a direction such as to be far away from the light deflector 20, from a position according to the design.

Figure 4:
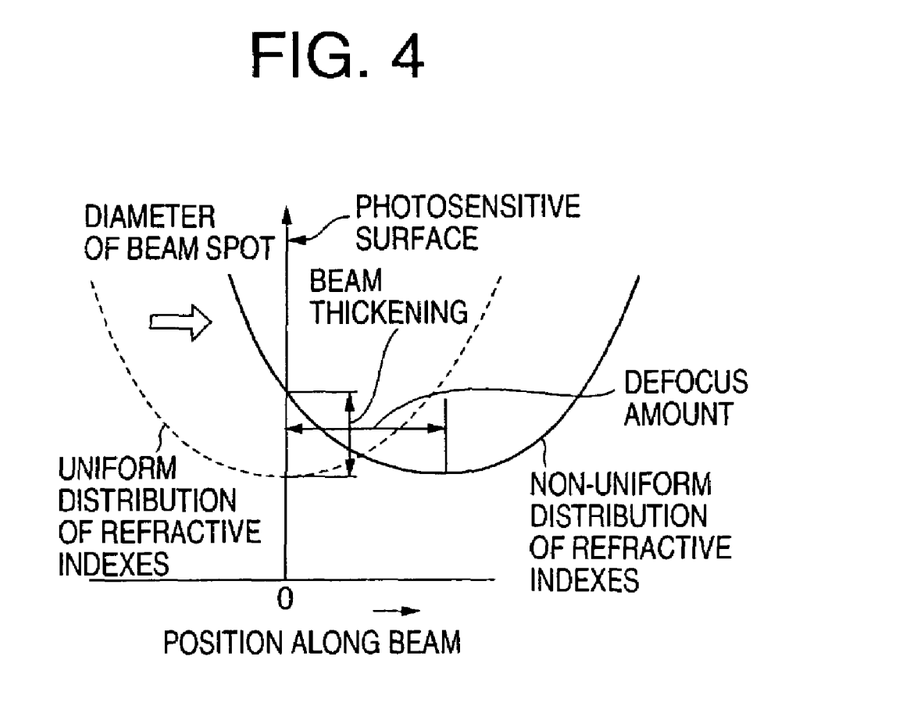
FIG. 4 illustrates increase in diameter of beam spot occurring due to influence of a non-uniform distribution of refractive indexes inside of the optical scanning lens.

In FIG. 4, a vertical axis represents a cross-sectional diameter of a beam, and a horizontal axis represents a position along the beam (difference from the surface to be scanned). The vertical axis coincides with the position of the photosensitive surface as the surface to be scanned.

When the distribution of refractive indexes is uniform inside of the optical scanning lens, the relationship between the position along the beam and diameter of the beam is, as indicated by a broken curve, shown in FIG. 4, such that the diameter of the beam becomes minimum at the position of the surface to be scanned (actually, the photosensitive surface; thus, the defocus amount is zero). However, when the distribution of refractive indexes is not uniform inside of the lens, the relationship between the position along the beam and diameter of the beam is, as indicated by a solid curve, such that the diameter of the beam at the position of the surface to be scanned (actually, the photosensitive surface) is larger than the value according to the design (crossing point between the broken curve and vertical axis), due to so-called 'beam thickening' occurring due to the defocus.

As the defocus amount $\Delta S'$ is approximately proportional to the secondary coefficient $\Delta n$ as mentioned above, it is possible to reduce the defocus amount $\Delta S'$ by reducing the secondary coefficient $\Delta n$.

The above-mentioned equation:

$$\Delta n(x) \approx n_0+\Delta n \cdot x^2$$

represents a parabola. Accordingly, the smaller the $\Delta n$ becomes, the smaller the variation rate of the refractive index with respect to the variable x. In other words, as the distribution of refractive indexes inside of the lens becomes nearer to a uniform one, the defocus amount resulting therefrom becomes smaller. This fact is reasonable.

Before further proceeding with the description, how to measure the distribution of relative y-axis-averaged refractive indexes $\Delta n(x)$ will now be described. The following method is one proposed by the present inventor and so forth (see Japanese Laid-open Patent Application No. 11-044641).

Figure 5:
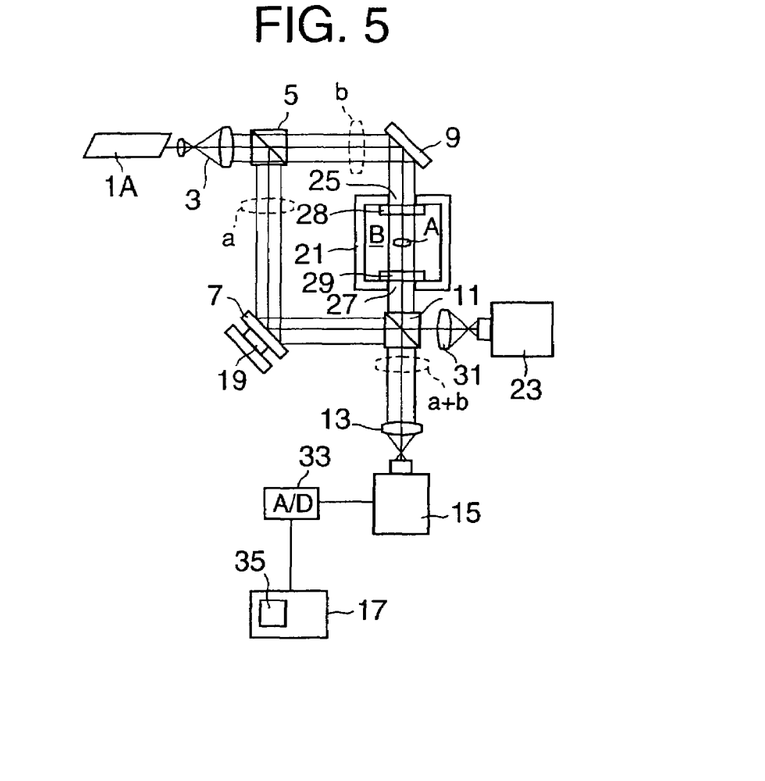
FIG. 5 illustrates a method of measuring a distribution of refractive indexes inside of a lens.

FIG. 5 illustrates an apparatus of measuring a refractive-index distribution using a Mach-Zehnder interferometer as a basic arrangement thereof.

A laser beam which is coherent light is emitted by a laser light source 1A, is transformed into a parallel beam as a result of a diameter thereof being enlarged by a beam expander 3, and is incident on a beam splitter 5. The beam splitter 5 splits the incident laser beam into two beams. Specifically, the incident laser beam is split by the beam splitter 5 into one laser beam which is obtained as a result of being bent at a right angle by the beam splitter 5 and is of a reference wave 'a', and another laser beam which is obtained as a result of being transmitted straightly by the beam splitter 5, being reflected by a reflective mirror 9 and being transmitted by a phase object as an object to be examined A and is of a wave to be examined 'b'. The beam splitter 5 splits the incident beam in a manner such that a ratio of intensities of the reference wave 'a' and wave to be examined 'b' be approximately '1:1'.

A reflective mirror 7 is supported by an electricity-movement converting device 19 formed of a piezoelectric device or the like, and is arranged in a manner such that a length of light path of the reference wave 'a' can be changed on the order of wave length for a purpose of performing analysis of interference fringes in accordance with a phase shifting method.

The reference wave 'a' is reflected by the reflective mirror 7 and reaches a beam splitter 11. The wave to be examined 'b' is reflected by the reflective mirror 9, is transmitted by the object to be examined A, and reaches the beam splitter 11. The beam splitter 11 joins the reference wave 'a' and wave to be examined 'b' together into a joined beam (a+b), and splits the joined beam into two beams. The electricity-movement converting device 19 is adjusted so that 'a phase difference of mπ/2' be obtained in length of light path between the reference wave 'a' and wave to be examined 'b' to be joined together, where 'm' is an integer. One split beam of the joined beam split by the beam splitter 11 is incident on an imaging lens 13, and, thereby, an image of interference fringes (of the reference wave 'a' and wave to be examined 'b') is formed on an image pickup surface of an interference-fringe detector 15. As the interference-fringe detector 15, a linear CCD, or an array-like sensor, disposed perpendicularly to the interference fringes is used. The other split beam of the joined beam split by the beam splitter 11 is incident on an image pickup surface of a CCD camera for monitoring 23, and, thereby, an image of the interference fringes is formed thereon, through an imaging lens 31.

A refractive index of the object to be examined A is considerably different from that of the air, and, unless an incident side and an emitting side of the object to be examined A are parallel to one another, the wave to be examined 'b' transmitted by the object to be examined A converges/diverges irregularly depending on a shape of the object to be examined A. In order to cause an image of interference fringes to be formed on the image pickup surface of the interference-fringe detector 15, the wave to be examined 'b' should be 'an approximately parallel beam'. The following arrangement is made in order to cause the wave to be examined 'b' having been transmitted by the object to be examined A to be an approximately parallel beam regardless of a shape of the object to be examined A.

That is, the object to be examined A is set inside a cell 21 provided on a light path of the wave to be examined 'b', and the cell 21 is filled with a test liquid B 'made up so that a refractive index thereof is approximately equal to a refractive index of the object to be examined A'. Two ends of the cell 21, that is an incident window 25 and an emitting window 27 for the wave to be examined 'b', are parallel to one another, and optical flats 28 and 29 each having a high surface accuracy are attached thereto, and the cell 21 is sealed for preventing the liquid inside thereof from leaking.

The cell 21 filled with the object to be examined A and test liquid B is an object, a distribution of refractive indexes of which is uniform through the entirety thereof, and an incident surface and an emitting surface of which are parallel to one another. Accordingly, the wave to be examined 'b' transmitted by the cell 21 is emitted therefrom as being an approximately parallel beam. When a refractive-index distribution inside the object to be examined A is non-uniform, a wave surface of the wave to be examined 'b' emitted from the cell 21 has 'a curved-surface shape depending on the refractive-index distribution'. Interference fringes, an image of which is formed on the image pickup surface of the interference-fringe detector 15, develop due to interference between the wave to be examined 'b' of the above-mentioned curved-surface shape and the reference wave 'a' which is a plane wave. Then the curved-surface shape of the wave to be examined 'b' can be measured by well-known analysis of these interference fringes.

The image of the interference fringes is detected by the interference-fringe detector 15, undergoes photoelectric conversion so as to become an electric image signal, is converted into a digital signal by an A-D converter 33, and is input to a calculation device 17.

The calculation device 17 includes a transmitted wave surface measuring unit 35 which measures and calculates a transmitted wave surface (a shape of wave surface of the wave to be examined 'b') by analysis of the interference fringes. Specifically, the calculation device 17 is a personal computer or the like which 'has a CPU and performs various calculation processes in accordance with programs stored in a hard disk drive or the like thereof'.

A refractive-index distribution of the optical scanning lens as the object to be examined A is measured as follows:

It is preferable that the design values for the outline shape and refractive index of the optical scanning lens are known. In measurement of the distribution of refractive indexes, data of the outline shape needed is the thickness along the optical axis. However, the measurement result is obtained as an amount reverse proportional to the thickness. Accordingly, even when an error is included in the thickness data given, it results in merely a little influence thereof to the result. With regard to the deign data of refractive index, the data is used for selecting the optimum test liquid B having a refractive index approximately the same as that of the object to be examined. Also in this case, merely a little influence to the measurement results therefrom as a measurement error.

The optical scanning lens as the object to be measured A is set in the cell 21, the coherent light from the laser light source 1 is incident on the optical scanning lens, and, as described above, an image of interference fringes is formed on the interference-fringe detector 15. An image signal of the image of the interference fringes output by the interference-fringe detector 15 is input to the calculation device 17, the transmitted wave surface measuring unit 35 in the calculating device 17 performs 'analysis of the interference fringes', and, thus, a transmitted wave surface WF(x) is measured. The apparatus shown in FIG. 5 is arranged so that the longitudinal direction of the linear CCD of the interference-fringe detector 15 corresponds to the x direction (sub-scanning direction) described above with respect to the optical scanning lens.

The thickness d(x) in the optical-axis direction of the optical scanning lens as the object to be examined A is obtained previously from the design data of the optical scanning lens, as mentioned above, or measured data thereof by a general-purpose measuring apparatus.

As mentioned above, based on the output of the linear CCD of the inference-fringe detector 15, the transmitted wave surface WF(x) is measured by the transmitted wave surface measuring unit 35. Then, an arbitrary position on the linear CCD is determined to be a position of 'x=0' and a reference transmitted wave surface WF(0) is obtained, and, then, Δn(x) is calculated by the following equation:

$$\Delta n(x) = \{WF(x) - WF(0)\} \cdot \lambda / d(x)$$

Thus, the distribution of the refractive indexes Δn(x) can be calculated for an arbitrary measurement section. A change of the measurement section can be performed by changing a position relationship between the linear CCD and the lens to be examined so that the lens to be examined is moved in the z direction relative to the linear CCD.

In the above-described method, $\Delta n(x)$ is calculated from 'an optical-axis-directional-thickness-directionally added-up transmitted wave surface'. Accordingly, although 'a refractive-index distribution of optical-axis direction' such as that shown in FIG. 2D cannot be obtained, the average data $\Delta n(x)$ obtained as a result of adding up along the optical-axis direction is sufficient to grasp the optical characteristics of the optical scanning lens. Further, because $\Delta n(x)$ is of one dimension, this can be easily managed as an evaluation item advantageously. Further, $\Delta n(x)$ in the above equation is a function of only 'x'. However, it is possible to perform two-dimensional measurement using (x, z) as variables.

$\Delta n(x)$ thus calculated as mentioned above can be practically expressed by the following polynomial, as mentioned above:

$$a+bx^2+cx^4+dx^6+ex^8+fx^{10}$$

Then, each coefficient a, b, c, d, e and f of the above-mentioned polynomial may be obtained through least squire or the like. Thereby, it is possible to immediately obtain the relative y-axis-averaged refractive indexes $\Delta n(x)$ at a coordinate position x along the x-axis.

By such a measuring method as that described above, it is possible to measure, in a non-destructive manner, the distribution of the relative y-axis-averaged refractive indexes $\Delta n(x)$ inside of the optical scanning lens formed through plastic mold.

Through such a measurement work, the present inventor found out that the distribution of the relative y-axis-averaged refractive indexes $\Delta n(x)$ of the optical scanning lens varies according to a manufacturing condition of the optical scanning lens, especially, according to a condition in which a heated resin injected into a die and thus molded is cooled.

When the die is left in a chamber of a normal temperature after the molding, and thus, natural cooling is performed thereon, one or several minutes are required for cooling it until the optical scanning lens in the die can be removed from the die. In this case, as the required cooling time is short, manufacturing efficiency is satisfactory. However, in such a manner, a distribution of the refractive indexes like a parabola such as that shown in FIGS. 2A through 2E develops.

In contrast thereto, when the optical scanning lens is removed from the die (or left in the die) after the molding, then, is brought into a thermostatic chamber, and is cooled gradually/slowly for ten and some hours, it is possible to reduce such a non-uniform distribution of refractive indexes developing inside of the optical scanning lens, remarkably. However, by such a manner, manufacturing efficiency is very unsatisfactory as a long time is required for the cooling.

When the optical scanning lens is removed from the die (or left in the die) after the molding, is brought into a thermostatic chamber, and is cooled gradually/slowly but for the order of 10 through 60 minutes as a result of the room temperature being gradually lowered, a local maximum appears in the distribution of refractive indexes inside of the lens as in the present invention.

A feature of the present invention is that the distribution (curve) of the relative y-axis-averaged refractive indexes $\Delta n(x)$ inside of the optical scanning lens has such a local maximum.

In general, the distribution of refractive indexes corresponds to a quadratic curve such that the refractive index becomes smaller as the position becomes near to the center, as described above with reference FIGS. 2A through 2E. Accordingly, increase in the amount of the secondary coefficient $\Delta n$ directly results in increase in the defocus amount. It is possible to reduce the defocus amount by reducing the difference $[\max\{\Delta n(x)\}-\min\{\Delta n(x)\}]$ between the maximum value $\max\{\Delta n(x)\}$ and the minimum value $\min\{\Delta n(x)\}$ of the distribution of the relative y-axis-averaged refractive indexes $\Delta n(x)$. However, in order to satisfy this requirement, a considerably long time is required to cool the molded plastic material, as mentioned above. Thereby, the productivity is degraded.

In contrast thereto, when the distribution (curve) of the relative y-axis-averaged refractive indexes $\Delta n(x)$ has a local maximum as in the optical scanning lens according to the present invention, it is possible effectively to reduce the secondary coefficient $\Delta n$ which has a large influence onto the optical performance as the defocus amount, even when the above-mentioned difference $[\max\{\Delta n(x)\}-\min\{\Delta n(x)\}]$ itself is large.

Each of the optical scanning lenses in first through fourth embodiments of the present invention which will be described now is assumed to be used as the optical scanning lens 30 of the optical scanning device described above with reference to FIG. 1.

The first through third embodiments thereof are produced through simulations of typical distributions (curves) of the relative y-axis-averaged refractive indexes $\Delta n(x)$ each having a local maximum.

Figure 6:
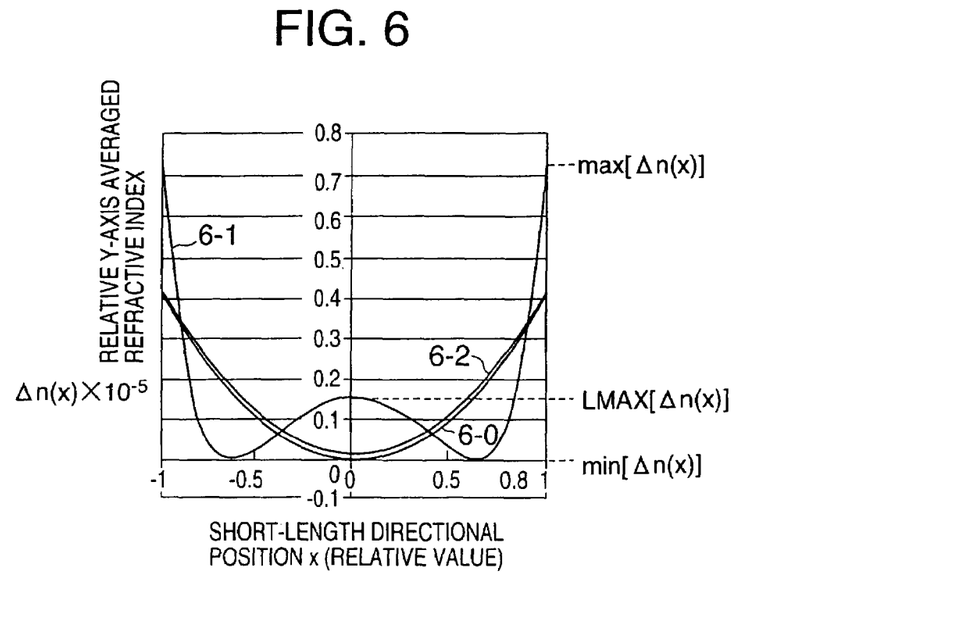
FIG. 6 illustrates a distribution of refractive indexes of an optical scanning lens in a first embodiment of the present invention.

The optical scanning lens in the first embodiment will now be described.

FIG. 6 illustrates the distribution of the relative y-axis-averaged refractive indexes $\Delta n(x)$ of the optical scanning lens in the first embodiment of the present invention (simulation result).

A vertical axis of FIG. 6 represents the relative y-axis-averaged refractive index $\Delta n(x)$. A horizontal axis thereof represents a position of the optical scanning lens along a short-length direction thereof, that is, the sub-scanning direction (x-axis direction) mentioned above. The distribution of the relative y-axis-averaged refractive indexes $\Delta n(x)$ shown in FIG. 6 is one on a sub-scanning section including the optical axis of the optical scanning lens. Accordingly, the origin of the horizontal axis coincides with the optical axis. A scale of the horizontal axis is expressed as a result of the effective diameter (range through which the proper beam passes through the lens) along the sub-scanning direction being normalized into a range between ±1. As an actual length, the order of ±2 mm (corresponding to ±1 in the scale of the horizontal axis shown in the figure) is assumed.

A curve 6-1 in FIG. 6 represents the above-mentioned distribution of the relative y-axis-averaged refractive indexes $\Delta n(x)$ of the optical scanning lens in the first embodiment of the present invention. The curve 6-1 has a local maximum $\mathrm{LMAX}[\Delta n(x)]=0.16\times10^{-5}$. Further, the curve 6-1 has local minimums 0 in the vicinity of ±0.6 of the horizontal axis. These local minimums are also the minimum values $\min[\Delta n(x)]$. The maximum value $\max[\Delta n(x)]$ of $\Delta n(x)$ is $0.71\times10^{-5}$ at ±1 of the horizontal axis.

A curve 6-2 in FIG. 6 is obtained from approximation of the above-mentioned curve 6-1 by the above-mentioned quadratic expression:

$$\Delta n(x) \approx n_0 + \Delta n \cdot x^2$$

In this case, the secondary coefficient $\Delta n$ is 0.1.

A curve 6-0 shown in FIG. 6 is a curve representing the distribution of the relative y-axis-averaged refractive indexes Δn(x) required by the required optical performance of the optical scanning lens in the first embodiment. That is, first, the secondary coefficient Δn corresponding to the allowable defocus amount under the circumstances in which the optical scanning lens in the first embodiment is actually used is obtained, and, by using the thus-obtained Δn, Δn(x) ≈$n^0$+Δn·$x^2$ is determined, and, is represented by the curve 6-0. In this case, $n_0$=0, and Δn=0.1. This curve 6-0 representing the distribution of the relative y-axis-averaged refractive indexes Δn(x) according to the required optical performance of the optical scanning lens in the first embodiment may vary according to the optical requirement. The optical requirement applied in this case is such that the maximum value of the distribution of the relative y-axis-averaged refractive indexes Δn(x) is such that max[Δn(x)] =0.4×$10^{-5}$.

As can be seen from a comparison between the curves 6-0 and 6-2, although the optical scanning lens in the first embodiment actually has the largely non-uniform distribution of the refractive indexes (that is, 0.71×$10^{-5}$) shown by the curve 6-1, the curve 6-2 which actually determines the optical characteristic (defocus) is substantially the same as the curve 6-0 representing the distribution of the refractive indexes required by the required optical performance of the optical scanning lens. Accordingly, even having the remarkably non-uniform distribution of the refractive indexes, the optical scanning lens in the first embodiment has the necessary/proper optical characteristic as being used as the optical scanning lens.

With regard to the maximum value and minimum value of the distribution of the relative y-axis-averaged refractive indexes Δn(x), even a mold product having a difference between the maximum value and minimum value 1.8 times (0.71/0.4) that of the lens according to the requirement of the curve 6-0 in optical characteristic has a defocus amount equivalent to the lens according to the requirement of the curve 6-0. In other words, an allowable range of the difference between the maximum value and minimum value of Δn(x) can be widened 1.8 times in this embodiment.

In the above-described first embodiment of the present invention, values of the above-mentioned requirements (1) and (2) are as follows:

$$LMAX[\Delta n(x)]-\min[\Delta n(x)]=0.16\times 10^{-5}$$

$$\{\max[\Delta n(x)]-\min[\Delta n(x)]\}/\{LMAX[\Delta n(x)]-\min[\Delta n(x)]\}=4.4$$

The optical scanning lens in the second embodiment of the present invention will now be described with reference FIG. 7.

Figure 7:
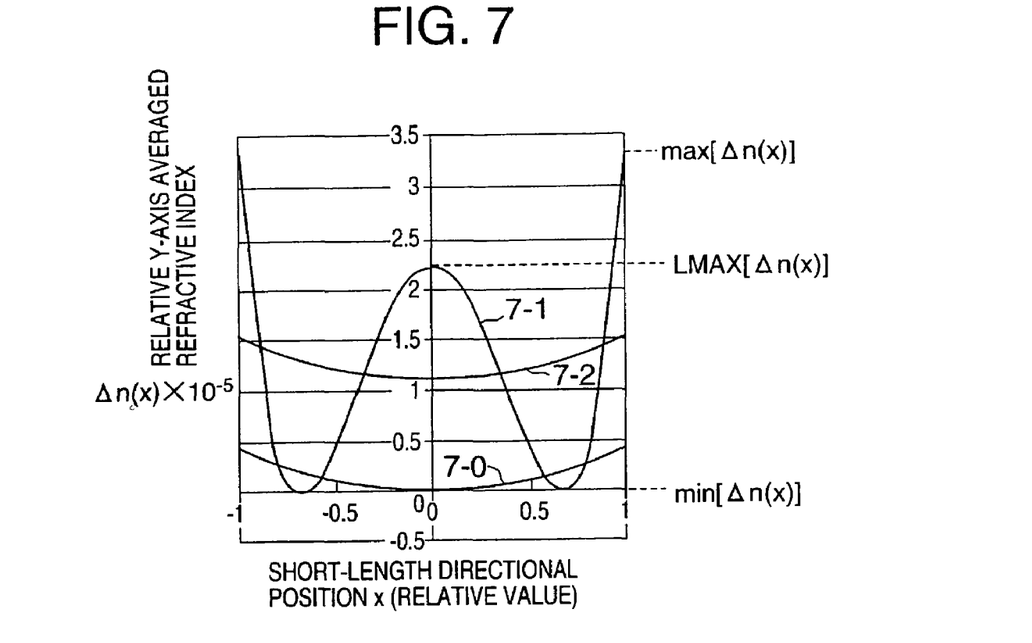
FIG. 7 illustrates a distribution of refractive indexes of an optical scanning lens in a second embodiment of the present invention.

FIG. 7 illustrates the distribution of the relative y-axis-averaged refractive indexes Δn(x) (simulation result) of the optical scanning lens in the second embodiment of the present invention. FIG. 7 is drawn in a manner the same as that in which FIG. 6 is drawn. Accordingly, curves 7-1, 7-2 and 7-0 correspond to the curves 6-1, 6-2 and 6-0, respectively.

Also in the second embodiment illustrated in FIG. 7, the secondary coefficient Δn with regard to the curves 7-2 and 7-0 has a value of 0.1. Values of the above-mentioned requirements (1) and (2) are as follows:

$$LMAX[\Delta n(x)]-\min[\Delta n(x)]=2.2\times 10^{-5}$$

$$\{\max[\Delta n(x)]-\min[\Delta n(x)]\}/\{LMAX[\Delta n(x)]-\min[\Delta n(x)]\}=0.66$$

Thus, the curve 7-1 has a high local maximum, and a ratio in difference between the maximum value and minimum value of the distribution of the relative y-axis-averaged refractive indexes Δn(x) is 8.4 (3.4/0.4). Accordingly, an allowable range of the difference between the maximum value and minimum value of Δn(x) can be widened 8.4 times in comparison to the lens to satisfy the curve 7-0 with regard to the optical characteristic.

The optical scanning lens in the third embodiment of the present invention will now be described with reference FIG. 8.

Figure 8:
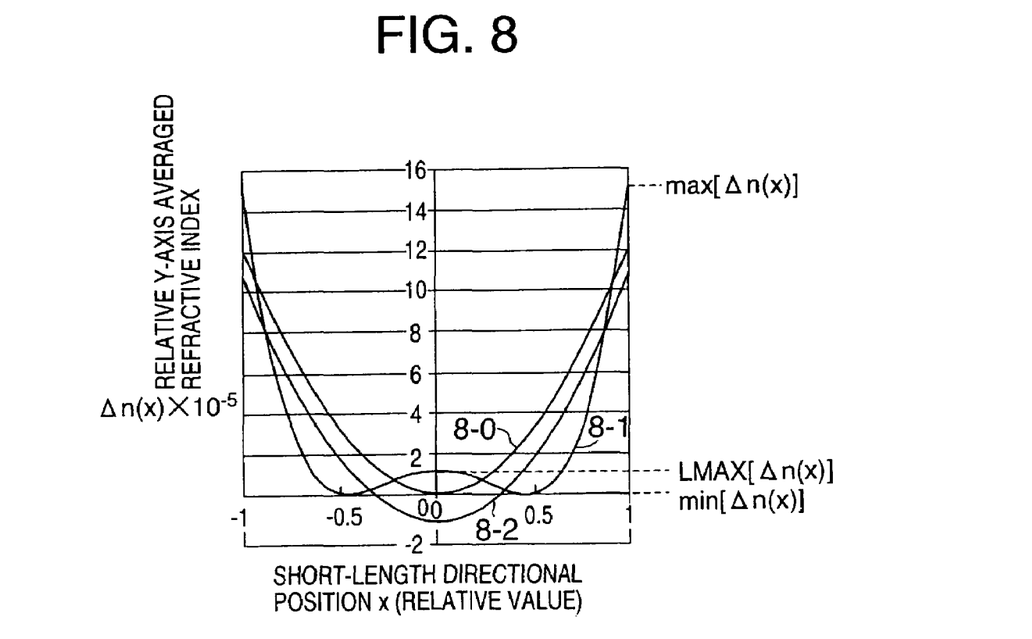
FIG. 8 illustrates a distribution of refractive indexes of an optical scanning lens in a third embodiment of the present invention.

FIG. 8 illustrates the distribution of the relative y-axis-averaged refractive indexes Δn(x) (simulation result) of the optical scanning lens in the third embodiment of the present invention. FIG. 8 is drawn in a manner the same as that in which FIG. 6 is drawn. Accordingly, curves 8-1, 8-2 and 8-0 correspond to the curves 6-1, 6-2 and 6-0, respectively.

In the third embodiment illustrated in FIG. 8, the secondary coefficient Δn with regard to the curves 8-2 and 8-0 has a value of 3.0. Values of the above-mentioned requirements (1) and (2) are as follows:

$$LMAX[\Delta n(x)]-\min[\Delta n(x)]=1.0\times 10^{-5}$$

$$\{\max[\Delta n(x)]-\min[\Delta n(x)]\}/\{LMAX[\Delta n(x)]-\min[\Delta n(x)]\}=14.5$$

A ratio in difference between the maximum value and minimum value of the distribution of the relative y-axis-averaged refractive indexes Δn(x) is 1.2 (14.5/12). Accordingly, an allowable range of the difference between the maximum value and minimum value of Δn(x) can be widened by the order of 20% in comparison to the lens to satisfy the curve 8-0 with regard to the optical characteristic.

Taking into consideration of the above-described optical scanning lenses in the first, second and third embodiments, as shown by the above-mentioned requirement (1), it is preferable to satisfy the following requirement:

$$0.1\times 10^{-5}<LMAX[\Delta n(x)]-\min[\Delta n(x)]<4\times 10^{-5}$$

with respect to difficulty in design and working for the optical scanning lens.

When this value is less than the lower limit 0.1×$10^{-5}$, the local maximum becomes smaller. Accordingly, the effect of reducing the defocus amount is small, and, a measurement error cannot be ignored.

When the value is higher than the upper limit 4×$10^{-5}$, working for the lens becomes difficult and thus requires high costs. Also, the wavefront aberration becomes approximately 0.3λ even in a lens having a thickness of 5 mm, for example. Accordingly, there is a possibility that beam thickening occurs due to the wavefront aberration.

In the above-mentioned optical scanning lens in the second embodiment, the range of the effective diameter is ±1 in relative value. However, when the range of the effective diameter is made to be ±0.8 in FIG. 7, the secondary coefficient Δn is approximately zero substantially, even a non-uniform distribution of the refractive indexes present inside of the lens, defocus hardly occurs, and, thus, it is further preferable. In this case, $$\{\max[\Delta n(x)]-\min[\Delta n(x)]\}/\{LMAX[\Delta n(x)]-\min[\Delta n(x)]\}\approx 1$$

Accordingly, a preferable range of the parameter {max[Δn(x)]−min[Δn(x)]}/{LMAX[Δn(x)]−min[Δn(x)]} is as follows as in the above-mentioned requirement (2):

$$1 \leq \{\max[\Delta n(x)] - \min[\Delta n(x)]\}/\{L\mathrm{MAX}[\Delta n(x)] - \min[\Delta n(x)]\} < 15$$

When this value exceeds the upper limit 15 (similarly to the third embodiment shown in FIG. 8), the effective of reducing the defocus amount obtained as a result of the distribution of the refractive indexes having the local maximum hardly appears.

Further, when the range of the effective diameter is reduced to ±0.5, no part including the local minimum is included in the range. In this case, a defocus amount develops slightly in the reverse direction. However, no problem occurs with respect to the performance, when the following requirement (1) is satisfied:

$$0.1 \times 10^{-5} < L\mathrm{MAX}[\Delta n(x)] - \min[\Delta n(x)] < 4 \times 10^{-5}$$

However, the effect of reducing the defocus amount is larger in a case where both the local maximum and local minimum are present in the distribution of the refractive indexes $\Delta n(x)$.

The distribution of the refractive indexes developing inside of a lens depends on a rate of cooling of a molded plastic material as mentioned above. As can be seen from FIGS. 2A through 2E, the optical scanning lens has a rectangular shape long along the main scanning direction, in general. Further, in general, in the optical scanning lens, the thickness thereof decreases as the position becomes far away from the optical axis thereof along the main scanning direction, as shown in FIG. 2A. The width thereof along the sub-scanning direction (x-axis direction) is fixed with respect to the position along the main scanning direction.

In other words, not in the main scanning direction but in the sub-scanning direction and also in the thickness direction, heat easily moves when the molded plastic is cooled.

Accordingly, tendency of non-uniform distribution of the refractive indexes is relatively small along the main scanning direction as shown in FIG. 2B. Further, in consideration of reduction in lens thickness in the main-scanning-directional periphery of the lens in general, it can be considered that the above-mentioned secondary coefficient $\Delta n$ resulting in defocus decreases as the position becomes far away from the optical axis of the lens along the main scanning direction.

Accordingly, it is not necessary that the optical scanning lens satisfies the above-mentioned requirements in that the distribution (curve) of the relative y-axis-averaged refractive indexes $\Delta n(x)$ has a local maximum or both a local maximum and a local minimum; and the above-mentioned requirements (1) and/or (2) are satisfied, throughout the entire range of the effective diameter (range through which the proper beam passes through the lens) along the main scanning direction.

That is, it is possible to obtain a practically sufficient optical performance only as a result of the optical scanning lens satisfying the requirement in that the distribution of the relative y-axis-averaged refractive indexes $\Delta n(x)$ has a local maximum or both a local maximum and a local minimum; and the above-mentioned requirements (1) and/or (2) are satisfied, through a main-scanning-directional range in the vicinity of the optical axis (for example, a range of 2 through 5 mm from the optical axis in each of both directions along the main scanning direction). Further, in consideration of variation of the relative y-axis-averaged refractive index $\Delta n(x)$ along the main scanning direction being continuous and gentle, it can be said that, when the optical scanning lens satisfies the requirement in that, only in a sub-scanning section of the lens on or in the vicinity of the center thereof along the main scanning direction in a range of the lens through which the proper beam passes therethrough, the distribution of the relative y-axis-averaged refractive indexes $\Delta n(x)$ has a local maximum or both a local maximum and a local minimum; and the above-mentioned requirements (1) and/or (2) are satisfied, this optical scanning lens can be used while no problem occurs with regard to the defocus characteristic.

When an inspection for determining whether or not a lens formed through plastic mold is suitable as the optical scanning lens can be made only by using one sub-scanning section on or in the vicinity of the main-scanning-directional center of the lens as mentioned above, it is possible to effectively improve the efficiency of inspection especially during a mass-producing process of the optical scanning lens.

Each of the above-mentioned curves 6-1, 7-1 and 8-1 shown in FIGS. 6, 7 and 8 with respect to the above-described first, second and third embodiments, respectively, represents the distribution of the relative y-axis-averaged refractive indexes $\Delta n(x)$ for the sub-scanning section including the optical axis thereof.

The optical scanning lens in the fourth embodiment of the present invention will now be described with reference FIG. 9.

Figure 9:
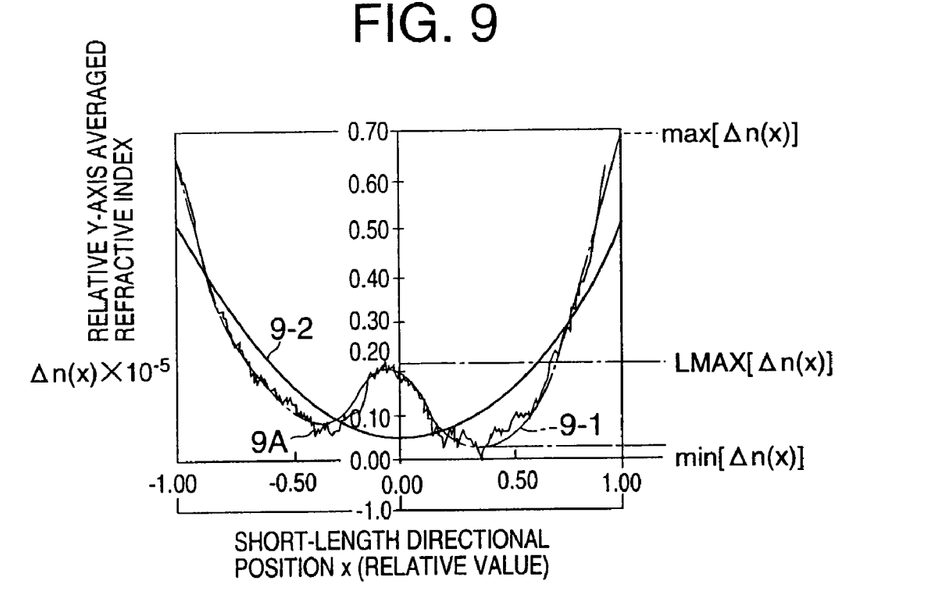
FIG. 9 illustrates a distribution of refractive indexes of an optical scanning lens in a fourth embodiment of the present invention.

FIG. 9 illustrates the distribution of the relative y-axis-averaged refractive indexes $\Delta n(x)$ (simulation result) of the optical scanning lens in the fourth embodiment of the present invention. FIG. 9 is drawn in a manner the same as that in which FIG. 6 is drawn with respect to the first embodiment.

A curve 9A shown in FIG. 9 represents actually measured values of the distribution of the relative y-axis-averaged refractive indexes $\Delta n(x)$ for the sub-scanning section including the optical axis of the optical scanning lens in the fourth embodiment. A curve 9-1 of chain line showing in FIG. 9 is obtained as a result of these actually measured values being expressed by using the above-mentioned polynomial:

$$a + bx^2 + cx^4 + dx^6 + ex^8 + fx^{10}$$

and corresponds to the curve 6-1 shown in FIG. 6.

According to the curve 9-1, $L\mathrm{MAX}[\Delta n(x)] = 0.215 \times 10^{-5}$, $\min[\Delta n(x)] = 0.03 \times 10^{-5}$, and $\max[\Delta n(x)] = 0.69 \times 10^{-5}$. Accordingly, the values of the above-mentioned requirements (1) and (2) are as follows:

$$L\mathrm{MAX}[\Delta n(x)] - \min[\Delta n(x)] = 0.19 \times 10^{-5}$$

$$\{\max[\Delta n(x)] - \min[\Delta n(x)]\}/\{L\mathrm{MAX}[\Delta n(x)] - \min[\Delta n(x)]\} = 3.47$$

A curve 9-2 is obtained as a result of the curve 9-1 being approximated by using the quadratic formula:

$$\Delta n(x) \approx n_0 + \Delta n \cdot x^2$$

and, at this time, the secondary coefficient $\Delta n = 0.1$.

A material of the optical scanning lens in the fourth embodiment is polyolefin resin. After molding this material, the optical scanning lens removed from the die is brought into a thermostatic chamber, and is cooled gradually for approximately one hour. The fourth embodiment has the distribution of the relative y-axis-averaged refractive indexes $\Delta n(x)$ near to that of the first embodiment produced in simulation, and thus, has functions similar to those of the first embodiment.

It is assumed that each of the above-described first through third embodiments produced in simulation is made of polyolefin by using the die used for producing the fourth embodiment.

As mentioned above, each of the optical scanning lenses in the first through fourth embodiments described with reference to FIGS. 6 through 9 is the optical scanning lens 30 used as the scanning and imaging optical system which condenses the beam deflected by the light deflector 20 on or in the vicinity of the surface to be scanned 40, is formed through plastic mold, and such that a distribution of the relative y-axis-averaged refractive indexes Δn(x) inside of the lens within a range through which the beam passes through the lens has a local maximum.

Further, the above-mentioned distribution of the relative y-axis-averaged refractive indexes Δn(x) has also a local minimum, and, also, the following requirement is satisfied:

$$0.1 \times 10^{-5} < LMAX[\Delta n(x)] - \min[\Delta n(x)] < 4 \times 10^{-5} \quad (1)$$

where LMAX[Δn(x)] denotes the above-mentioned local maximum, and min[Δn(x)] denotes the minimum value of the above-mentioned distribution of the refractive indexes Δn(x), and, also, the following requirement is satisfied:

$$1 \leq \{\max[\Delta n(x)] - \min[\Delta n(x)]\} / \{LMAX[\Delta n(x)] - \min[\Delta n(x)]\} < 15 \quad (2)$$

where max[Δn(x)] denotes the maximum value of the above-mentioned distribution of the refractive indexes Δn(x).

Further, within the range through which the beam passes through the lens, and also, in a sub-scanning section on or in the vicinity of the center of the lens along the main scanning direction, the distribution of the refractive indexes Δn(x) inside of the lens has the local maximum and the local minimum, and, also, the following requirements are satisfied:

$$0.1 \times 10^{-5} < LMAX[\Delta n(x)] - \min[\Delta n(x)] < 4 \times 10^{-5} \quad (1)$$

where LMAX[Δn(x)] denotes the above-mentioned local maximum, and min[Δn(x)] denotes the minimum value of the above-mentioned distribution of the refractive indexes Δn(x), and, also, the following requirement is satisfied:

$$1 \leq \{\max[\Delta n(x)] - \min[\Delta n(x)]\} / \{LMAX[\Delta n(x)] - \min[\Delta n(x)]\} < 15 \quad (2)$$

where max[Δn(x)] denotes the maximum value of the above-mentioned distribution of the refractive indexes Δn(x).

Further, in the optical scanning device employing any one of the above-mentioned optical scanning lenses in the first through fourth embodiments of the present invention as the optical scanning lens 30, the beam coming from the light source 10 is deflected at a uniform angular velocity by the light deflector 20 having the deflection reflective surface, the deflected beam is condensed onto the surface to be scanned 40 by the scanning and imaging optical system 30, and, thus, optical scanning of the surface to be scanned 40 in a uniform velocity is performed. In this configuration, the optical scanning lens in one of the first through fourth embodiments of the present invention is used at least a part of the above-mentioned scanning and imaging optical system. Actually, in the configuration shown in FIG. 1, the optical scanning lens 30 itself forms the scanning and imaging optical system.

The optical scanning device according to the present invention may also be embodied as a so-called multi-beam scanning device.

Figure 10:
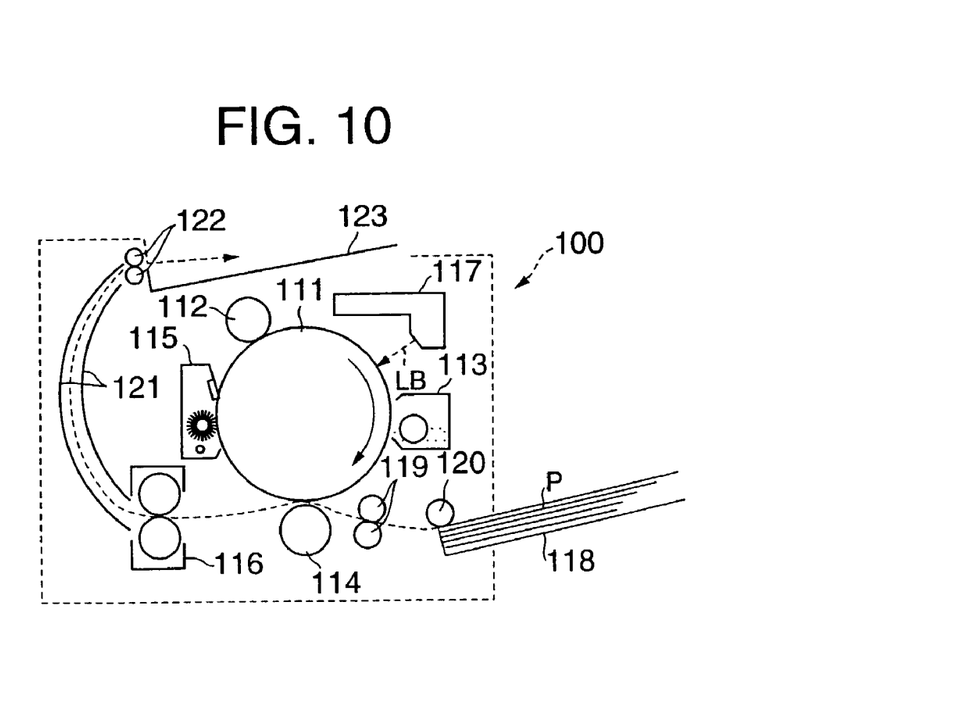
FIG. 10 illustrates an image forming apparatus in one embodiment of the present invention.

With reference to FIG. 10, an image forming apparatus in one embodiment of the present invention will now be described.

The image forming apparatus shown in FIG. 10 is a laser printer, for example.

This laser printer 100 has a cylindrical photoconductive photosensitive body acting as a photosensitive medium 111. Around the photosensitive medium 111, a charging roller 112 acting as a charging unit, a developing device 113, a transfer roller 114, and a cleaning device 115 are disposed. It is also possible to use a well-known corona charger as the charging unit.

Further, an optical scanning device 117 using a laser beam LB is provided, and performs exposure of the photosensitive medium 111 through optical writing between the charging roller 112 and developing device 113.

As shown in FIG. 10, a fixing device 116, a cassette 118, a pair of registration rollers 119, a paper feeding roller 120, a conveying path 121, a pair of paper ejecting rollers 122, and a tray 123 are also provided. Transfer paper P is used as a sheet-type recording medium.

When image formation is performed, the photosensitive medium 111 is rotated clockwise at a uniform velocity, the surface thereof is charged uniformly by the charging roller 112, and an electrostatic latent image is formed on the surface (surface to be scanned) of the photosensitive medium 1111 through exposure by optical writing with the laser beam LB of the optical scanning device 117. The thus-formed electrostatic latent image is a so-called negative latent image having an image part exposed thereby.

This electrostatic latent image is developed inversely by the developing device 113, and, thus, a toner image is formed on the photosensitive medium 111.

The cassette 118 containing the transfer paper P is detachable from/to the body of the image forming apparatus 100. In the state in which the cassette 118 is loaded as shown in the figure, the top one sheet of the transfer paper P is fed by the paper feeding roller 120. The thus-fed transfer paper P is nipped by the pair of registration rollers 119 at the top of the paper P. The pair of registration rollers 119 feed the transfer paper P to a transfer position of the photosensitive medium 111 at the time at which the toner image is moved to the transfer position. The fed transfer paper P is laid onto the toner image at the transfer position, and, by the function of the transfer roller 114, the toner image is transferred to the transfer paper P electrostatically.

The transfer paper P thus having had the toner image transferred thereto is sent to the fixing device 116, which fixes the toner image onto the transfer paper P. Then, the transfer paper P passes through the conveying path 121, and is ejected to the tray 123 by the pair of ejecting rollers 122. The surface of the photosensitive medium 111 is then cleaned by the cleaning device 115, and, thus, remaining toner, paper powder and so forth are removed therefrom.

It is also possible to use an OHP sheet instead of the above-mentioned transfer paper. A provision may be made such that the transfer of the toner image is performed via an intermediate transfer medium such as an intermediate transfer belt or the like.

In the above-described image forming apparatus shown in FIG. 10, the optical scanning device, shown in FIG. 1, employing the optical scanning lens such as that in any of the first, second, third and fourth embodiments of the present invention described above with reference to FIGS. 6 through 9 as the optical scanning lens/scanning and imaging optical system thereof is used as the above-mentioned optical scanning device 117.

In this image forming apparatus, the photosensitive medium 111 is a photoconductive photosensitive body, and the electrostatic latent image formed on the photosensitive surface thereof through the uniform charging by the charging roller 112 and the optical scanning by the optical scanning device 117 is visualized into the toner image through the development by the developing device 113.

The present invention is not limited to the above-described embodiments, and variations and modifications may be made without departing from the scope of the present invention.

The present application is based on Japanese priority application No. 2000-161586, filed on May 31, 2000, the entire contents of which are hereby incorporated by reference.

What is claimed is:

1. An optical scanning lens having a distribution of refractive index inside thereof, comprising:

a region within a range through which a beam passes, in which region a lens power decreases from a center to a periphery of the region in a sub-scanning direction, wherein the lens power is a reciprocal of a focal length of the lens, and the lens power is positive at the center and the lens power is negative at the periphery in the sub-scanning direction in the range through which the beam passes.

2. An optical scanning lens as claimed in claim 1, wherein the lens power originates in refractive index distribution.

3. An optical scanning lens having a distribution of refractive index inside thereof, comprising:

a first region and a second region within a range through which a beam passes, in which a lens power in the first region is positive, and the lens power in the second region is negative, wherein the lens power is a reciprocal of a focal length of the lens.

4. An optical scanning lens as claimed in claim 3, wherein the lens is formed of a plastic material.

5. An optical scanning lens having a distribution of refractive index inside thereof, comprising:

a region within a range through which a beam passes, in which region a lens power decreases from a center to a periphery of the region, wherein the lens power is a reciprocal of a focal length of the lens, and the lens power is positive at the center and the lens power is negative at the periphery in the range through which the beam passes.

* * * * *